Oct. 23, 1928.                                               1,688,388
G. HORVATH
CHARGE FORMING DEVICE FOR INTERNAL COMBUSTION ENGINES
Filed Nov. 3, 1919          7 Sheets-Sheet 1

Oct. 23, 1928.

G. HORVATH

CHARGE FORMING DEVICE FOR INTERNAL COMBUSTION ENGINES

Filed Nov. 3, 1919  7 Sheets-Sheet 7

1,688,388

Inventor
GEZA HORVATH.
By [signature]
Attorney

Patented Oct. 23, 1928.

1,688,388

UNITED STATES PATENT OFFICE.

GEZA HORVATH, OF HIGHLAND PARK, MICHIGAN.

CHARGE-FORMING DEVICE FOR INTERNAL-COMBUSTION ENGINES.

Application filed November 3, 1919. Serial No. 335,342.

This invention relates to certain new and useful improvements in charge forming devices for internal combustion engines, the object being to provide a device by means of which an absolutely dry explosive charge can be formed out of liquid fuels high or low grade, such as gasoline, alcohol, naphtha or kerosene, whereby extreme economy can be obtained from liquid fuels.

Another and further object of the invention is to provide a device in which means is provided for forcing the fuel under pressure through a coil or vessel located in a heating chamber whereby the fuel before it is delivered to the mixing chamber is superheated and retained in liquid form.

Another object of the invention is to provide a charge forming device wherein heated air passes by the fuel jets and is then mixed with cold air which is delivered through a plurality of ports arranged around the mixing chamber in such a manner that a very high explosive mixture is produced.

Another object of the invention is to provide a novel form of pump for forcing the fuel and maintain the same under pressure within the coil or vessel of the heated chamber, said pump being so constructed that the capacity of the same can be regulated, whereby the amount of fuel delivered to the charge forming device can be regulated so that the device can be set whereby a predetermined quantity of fuel delivered to the charge forming device will determine the number of miles per gallon in motor vehicle travel.

Another object of the invention is to provide novel means for maintaining fuel within the pump housing whereby the ordinary vacuum system now employed can be dispensed with.

A still further object of the invention is to provide a charge forming device wherein the amount of air admitted to the mixing chamber is controlled by the movement of the throttle valve, so that as the throttle is opened a greater amount of air is admitted.

Another and further object of the invention is to provide a construction of charge forming device which can be readily installed on the ordinary internal combustion engine especially used on motor vehicles in such a manner that the pump will be driven from the engine whereby a forced feed charge forming device formed having a coil or vessel arranged within a heating chamber containing fuel under pressure whereby the fuel will be superheated above boiling point and will still remain in liquid form before it is injected into the mixing chamber.

A still further object of the invention is to provide a dash controlled valve unseater to be used in starting the engine while cold by providing a free passage for cold fuel to a chamber which supplies the fuel to the jets.

Other and further objects and advantages of the invention will be hereinafter set forth and the novel features thereof defined by the appended claims.

Figure 1:
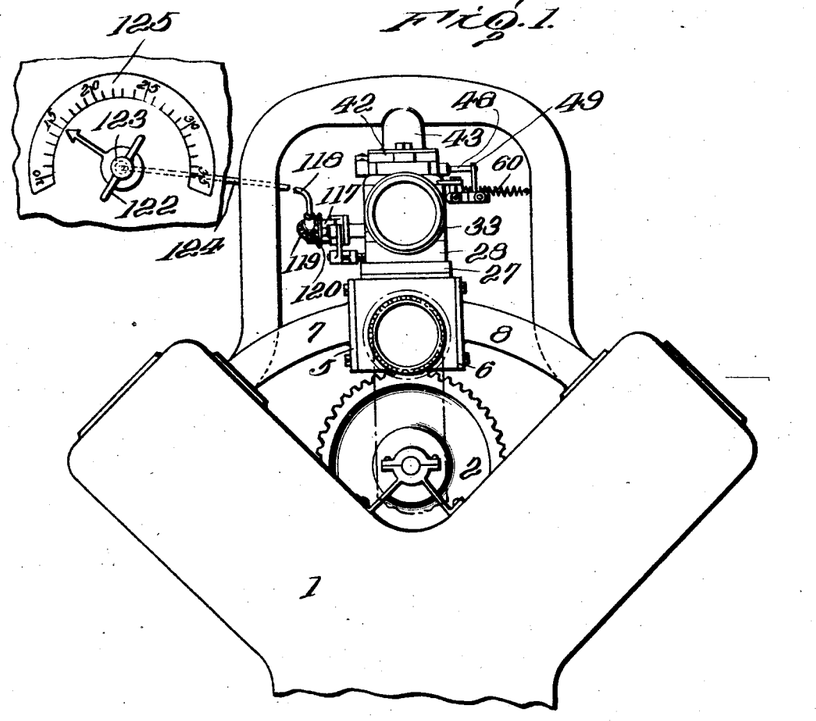
Figure 1 is an elevation for a charge forming device constructed in accordance with my invention showing the application of the same to a V-type of motor.
Figure 2:
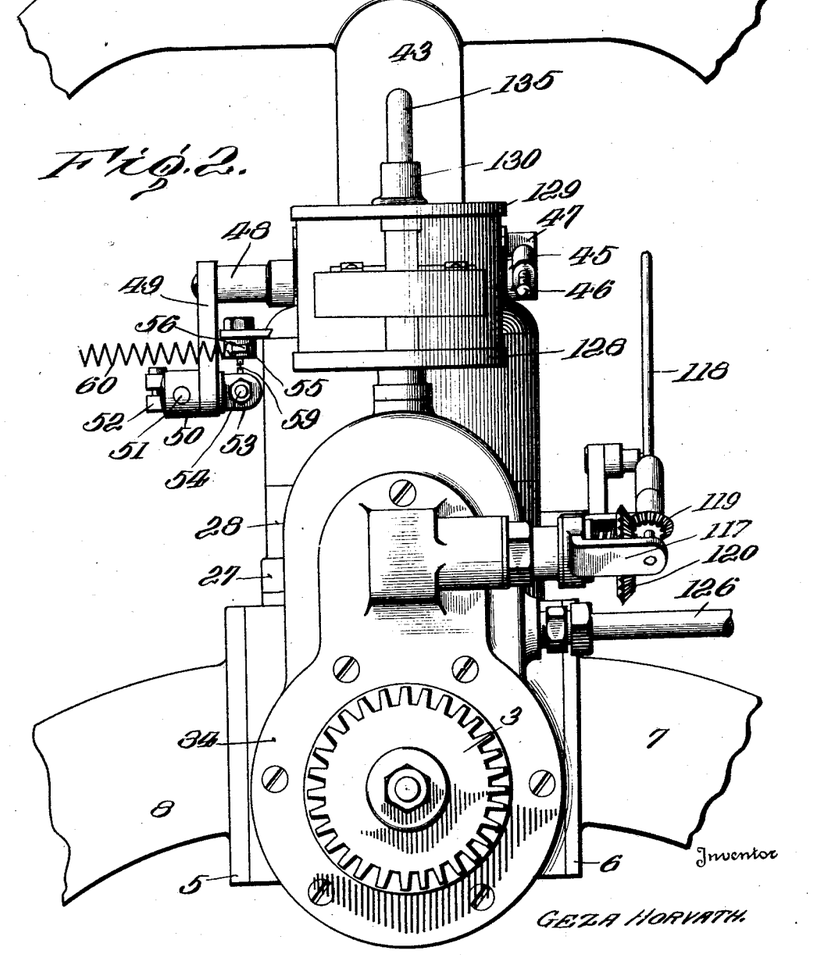
Figure 2 is an enlarged end elevation of the charge forming device showing the position of the intake and exhaust pipes.
Figure 3:
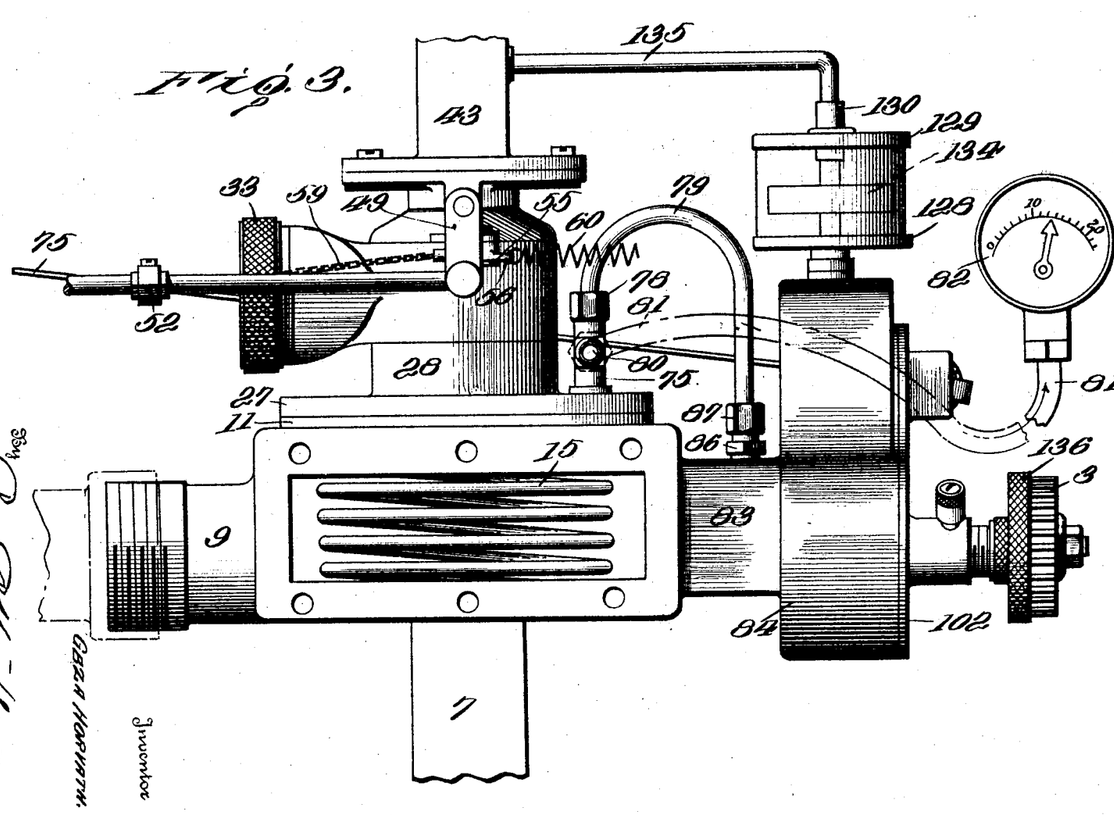
Figure 3 is a side elevation of the charge forming device constructed in accordance with my invention, one of the side plates of the heating chamber being removed so as to show the heating coil or vessel disposed therein.

In the drawings, 1 indicates an internal combustion engine of the V-type having a gear 2, which is adapted to mesh with a gear 3 of my improved construction of charge forming device for driving the same as will be hereinafter fully described, the above description being given so that the operation of my improved construction of charge forming device can be readily understood when attached to a motor.

This device consists of three (3) distinct units.

1st. The mechanical fuel feeding device, which is actuated by the engine itself. This device feeds the fuel proportionately to the engine as best suited to variable speeds and load conditions.

2nd. The superheating element, which consists of an enclosed and heated vessel. In the present case this is a coil of tubing which is located conveniently in the exhaust manifold, the object of this heating element is to superheat the fuel above boiling temperature, or about 300° Fahrenheit and retain it under pressure in liquid form until it is delivered to the mixing chamber.

3rd. The mixing chamber, which is attached to the intake manifold, having the butterfly valve between. The object of this chamber is to receive the superheated fuel and thoroughly mix it with air, thus producing a dry and highly efficient explosive mixture.

In the present case these three units are combined in one. These can be separated to the best advantage of engine construction to which they may be applied.

In constructing a charge forming device in accordance with my invention, as shown in the drawings, I employ a housing 4, which is provided with removable side plates 5 and 6, having pipes 7 and 8, connected thereto which are adapted to extend from the exhaust of the internal combustion engine whereby the spent gases from the motor will be conveyed into the housing 4, which forms a heating chamber, and is provided with an outlet 9, to which a pipe 10 is adapted to be connected which extends to the muffler in the ordinary manner. The top of the housing 4 is closed by a plate 11, provided with a vertical stem 12, which is internally threaded as shown at 13, into which is adapted to extend a nipple 14, to which is connected one end of a coil, or vessel 15, by a coupling 16, into which is adapted to be forced and maintained fuel under pressure, as will be hereinafter fully described.

The stem 12 is provided with a vertical bore 17, terminating at its upper end in a chamber 19, formed by an annular groove. The walls of the chamber are beveled to provide valve seats 21 and 20 upon which is adapted to be seated the conical valve 21 which is provided with a stem 22 working in the bore 17, and an upwardly projecting stem 23 surrounded by a coil spring 24 for the purpose hereinafter fully described. The stem 12 has a chamber 25 formed by the plug 14, and extending from the chamber 25 to the chamber 19 are fuel passages 26 through which fuel is adapted to pass in the form of superheated liquid after the same has been superheated in the coil, or vessel, within the heating chamber. These fuel passages 26 are arranged in pairs as shown.

Mounted on the plate 11 is a casing 27, which is enlarged as shown at 28, and is provided with a vertical tubular portion 29, having its walls formed with a plurality of spirally arranged openings 30. The casing 27 carries a member 31 which forms an air chamber 32, around the tubular portion 29, said member 31 being provided with a coupling 33, to which is adapted to be connected an air pipe 34 leading from any suitable source of supply or to the atmosphere. The tubular portion 29 is surrounded by a tubular air valve 35, which is provided with a plurality of spirally arranged openings 36, adapted to register with the openings of the tubular member and through which air is adapted to be admitted. The upper edge of the tubular valve 35 is flanged as shown at 37 and is seated on the member 31, so as to oscillate freely thereon, said flange 37 having an arm 39 which is adapted to be connected to the throttle valve operating means, as will be hereinafter fully described.

Mounted on the member 31 is a cap 40 which is provided with a throttle valve 41 and is enlarged as shown at 42, forming means for connecting the same to the intake manifold or induction pipe 43, which as herein shown is in the form of an inverted V, each branch of which extends to the series of cylinders. As I have shown my device used in construction with V-shape motor but I do not wish to limit myself in any way to the construction of the induction pipes or exhaust pipes, as of course it is clearly understood that the device is capable of being operated with only one induction pipe and only one exhaust pipe as the exhaust gases from one exhaust pipe will be conveyed to the heating chamber wherein the coil and heating vessel containing the fuel will be heated, only I have found by experimenting that by providing two sources of supply for exhaust gases a greater heat is obtained.

The throttle valve 41 is mounted on a stem 44 extending through the walls of the cap members which is enlarged as shown so as to provide bearings. One end of the stem carries an arm 45, provided with an adjusting screw 46, which is adapted to engage a lug 47, for limiting the closing movement of the throttle which is the ordinary construction of throttle means now used in connection with carbureters. The other end of the arm of the valve stem 44 carries a sleeve 48 provided with an arm 49 in which is mounted a bolt 50, the head of which is provided with a threaded bore in which the threaded end of a rod 51 is mounted which has mounted thereon at its outer end a split sleeve 52, provided with an arm 53, in which an adjustable rod 54 is mounted, said rod having a threaded portion working in the aperture formed in the arm 53 carrying nuts for locking the rod in its adjusted position.

The arm 39 of the tubular valve is apertured and carries a bolt 55, on which is mounted a collar 56 having an extension 57, which is connected to the adjusting rod 54 by a chain 59, whereby the movement of the air valve will be in unison with the throttle valve. The sleeve of the air valve carries a coil spring 60 which is connected to a fixed part of the motor so that the tendency of the air valve and throttle is to remain closed.

The stem 12 is threaded at its upper end on which is mounted the threaded sleeve portion 61 of a disk nozzle 62, which nozzle is enlarged as shown at 63, to provide a chamber into which the fuel from the fuel passages is adapted to be forced. The disk nozzle 62 fits tightly within the tubular portion of the casing 27 and is provided with a plurality of radial ports 64 which are closed at their outer ends by the wall of the tubular portion and these ports are provided with vertical passages 65 forming jets through which the fuel is delivered into the mixing chamber below the throttle. The disk nozzle 62 is provided with a plurality of openings 66 forming air passages as will be later described. The enlarged portion 63 forming the chamber forms a housing for the conical valve 21, and is provided with an internally threaded stem 67 in which is adjustably mounted a threaded nut 68, the lower end of which engages the coil spring 24 so that the tension of the spring can be adjusted, whereby the valve will be held on its seat so as to completely close the chamber 19, into which the fuel is delivered until the pressure is sufficient to overcome the tension of the spring.

The enlarged portion 28 of the casing 27 is provided with a plurality of air inlet openings 69 and the casing is formed with fins 70 so constructed that the air passes downwardly from the air chamber through the openings 69 around the fins and then toward the center and up through the tubular portion and as the disk nozzle with its plurality of air ports and plurality of jets is disposed in the tubular portion, the jets of fuel are subjected to air currents passing through the air openings 66 so that the gas or explosive mixture produced is delivered into the mixing chamber thoroughly mingled and as the tubular air valve is opened by the movement of the throttle, an additional air is mixed with the explosive charge so that a lean mixture is produced of a high explosive nature.

In order to provide means for unseating the valve 21 for starting the motor to which the device is attached, while cold for adjusting the position of the valve in respect to its seat so as to provide free passage for the cold fuel delivered through the jets, I mount a stem 71 within the casting in a threaded sleeve 72, said stem having an eccentric portion 73, which is adapted to engage the stem 22 of the valve so as to raise and lower the valve, said stem having an arm 74, to which is connected a rod 75, extending to the dash whereby I provide a dash control for opening the valve.

From the foregoing description it will be seen that I have provided a charge forming device wherein a mixing chamber is provided having a plurality of air ports controlled by a rotary valve in connection with a disk nozzle having a plurality of jets disposed between air passages whereby superheated fuel or vapor delivered from the jet is first mixed with heated air as the casing is disposed on the plate above the heating chamber and becomes hot when in use so that as the cold air is first drawn downwardly and circulates through the casing so that it is heated before it passes upwardly through the air openings arranged to each side of the fuel jets.

Figure 4:
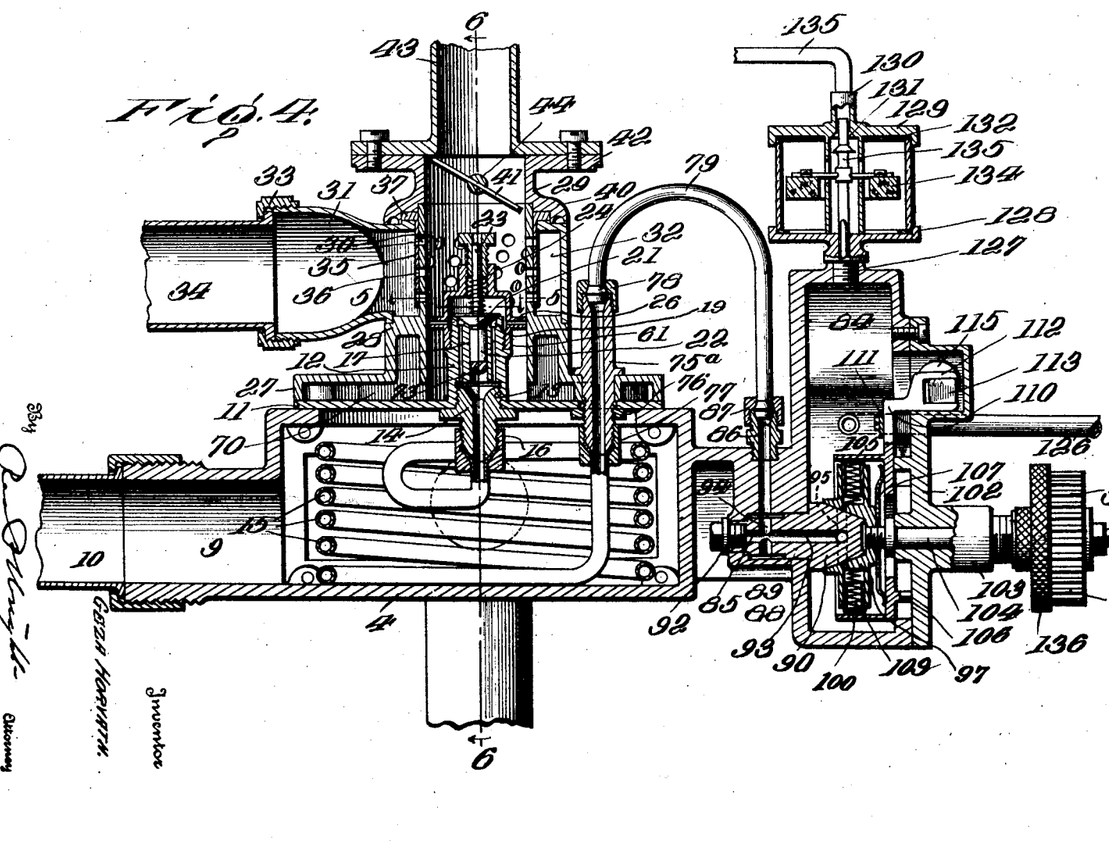
Figure 4 is a vertical longitudinal section through my improved construction of charge forming device.
Figure 5:
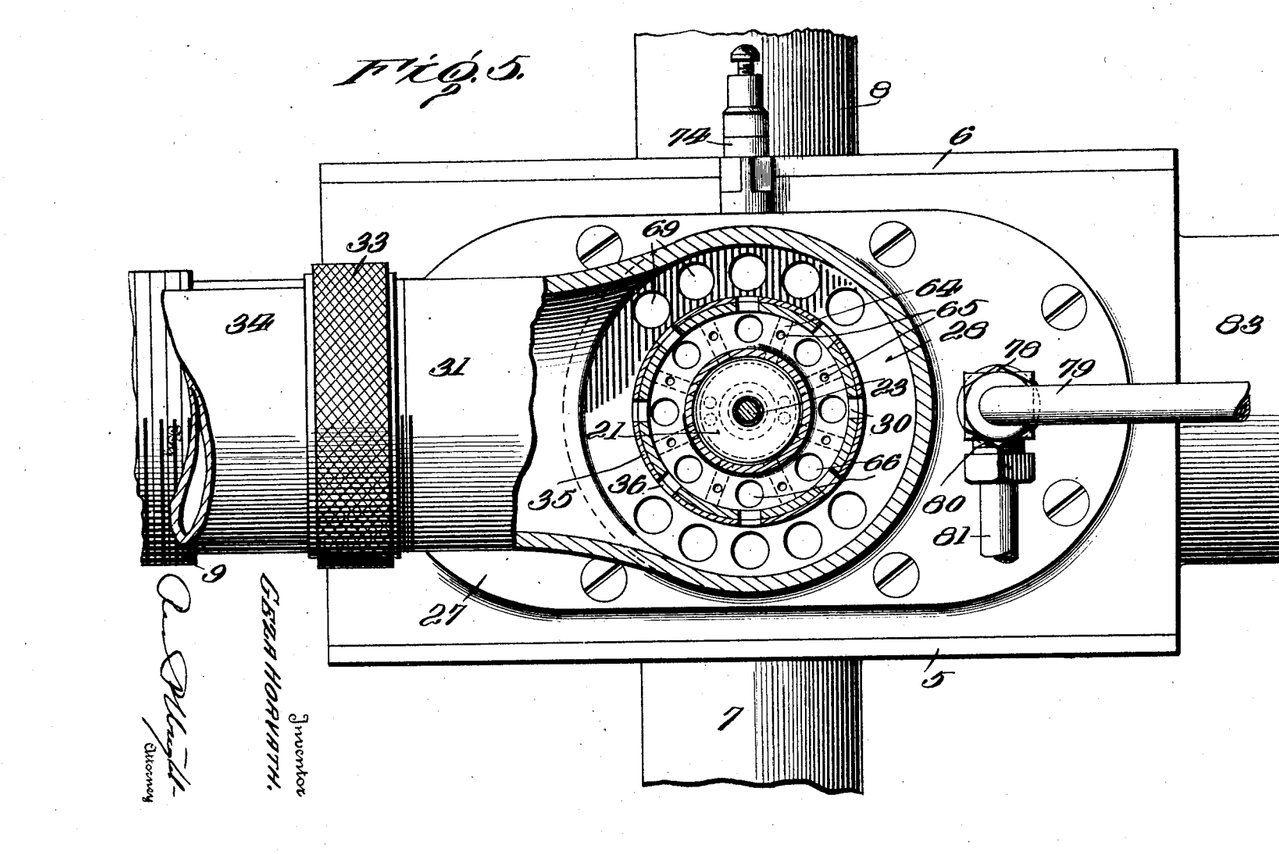
Figure 5 is an enlarged horizontal section taken on the line 5—5 of Figure 4.
Figure 6:
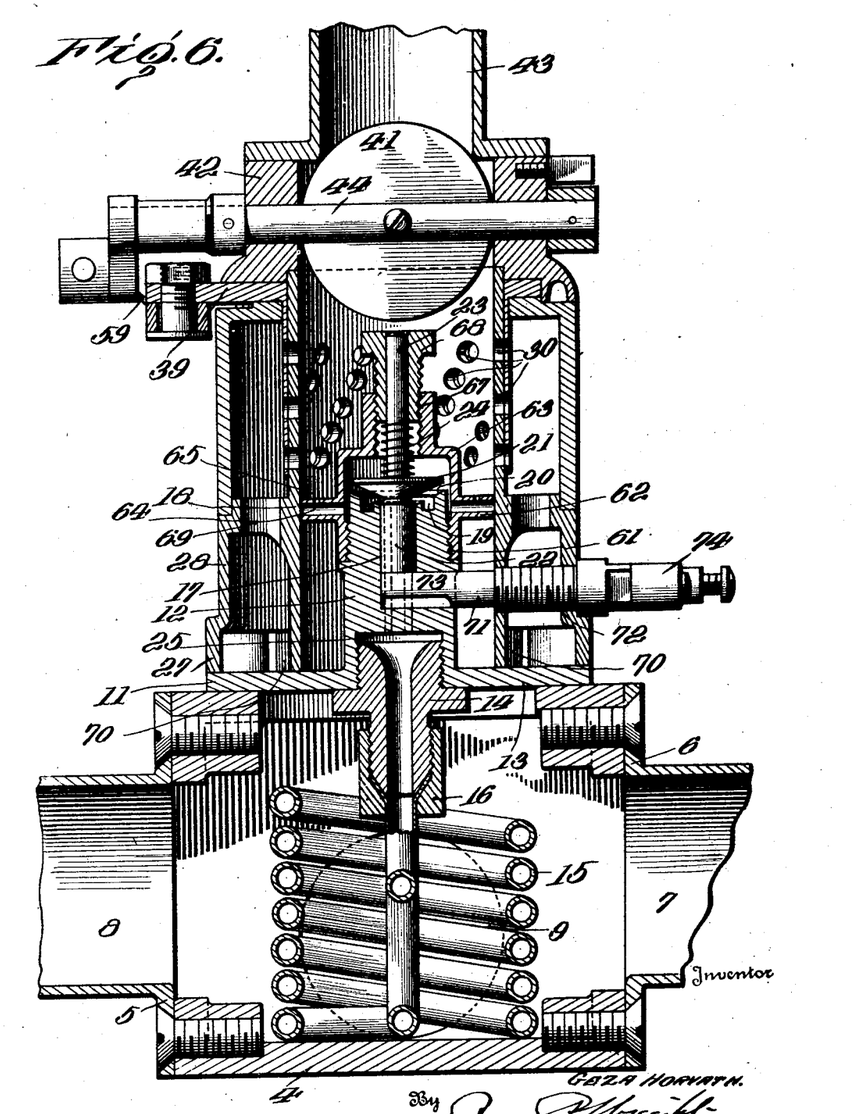
Figure 6 is an enlarged vertical section taken on the line 6—6 of Figure 4.

Extending downwardly through the casing 27 and plate 11 is a tubular stem 75ª which is provided with a nut 76 for locking the parts together and carries a coupling 77 at its lower end for connecting the tubular stem with the other end of the heating vessel 15, as clearly shown in Fig. 4. The upper end of the stem is provided with a coupling 78, for connecting the fuel pipe 79 thereto. The stem 75 is provided with a threaded lateral branch 80 which is connected to the pipe 81 extending to the pressure gage 82, arranged on the dash of the motor whereby the pressure of the fuel within the heating vessel can be ascertained as will hereinafter be fully described.

The housing 4 has an extension 83 opposite the outlet which extension carries the pump housing 84. The extension 83 is provided with the vertical fuel passage 85 terminating at its upper end in a charge threaded bore in which is arranged a nipple 86, carrying a coupling member 87, for connecting the same to the end of the fuel pipe 79, as clearly shown in Fig. 4.

A horizontal bore 88 is formed in the extension in which is arranged a stem 89 having a conical head 90, said stem being secured in position within the bore by a screw 91, as is clearly shown in Figure 4. The stem 89 is provided with a bore 93 having ports 94 forming communication between the fuel passage 85 and the bore 93. The bore 93 of the head 90 terminates in a lateral passage 95, which terminates in a notch 96 formed in the conical head. Mounted on the conical head 90 is the conical socket 97 of a rotor 98, which is provided with a plurality of radial bores 99 forming cylinders for cup-shaped pistons 100. The cylinders or bores 99 are provided with passages 101 communicating with the socket and through which fuel is adapted to be forced by the pistons as the rotor is revolved. The pump housing 84 is provided with a cover plate 102 provided with a bearing 103 in which is mounted a shaft 104, to the inner end of which is connected the rotor 98, said rotor being arranged within a cylinder 105, which is provided with a lug 106, working in a slot formed in the cover plate for guiding the cylinder in its up and down movement. One end of the cylinder is entirely open and the other end is partly closed by the annular flange against which is arranged a spring 107 which forces the conical socket of the rotor in engagement with the conical projection or head of the stem, so that a tight fit is formed between the two abutting parts. The cup-shaped pistons are mounted on coil springs 109 within the cylinders or bores and as the rotor rotates these pistons are reciprocated as the cylinder 105 is adjusted eccentrically so as to cause the pistons to force fuel through the head and by the way of the conduit 79 into the vessel arranged within the heating chamber. The cylinder 105 is provided with an arm 110 slidably mounted in a guide-way 111 and provided with an enlarged bifurcated end 112, in which is arranged a block 113 having a bore to which extends a pin 114 mounted eccentrically on the enlarged end 115 and shaft 116, which produces an eccentric connection so that the rotation of the shaft 116 will cause the cylinder 105 to move up and down in order to change the relative position of the same in respect to the pistons of the rotor and by this construction a rotary pump is produced having means whereby the capacity of the pump can be increased and decreased as by adjusting the cylinder 105 in respect to the rotor the length of the stroke of the pistons is increased or decreased. As the rotor revolves the pistons suck in fuel through one of the radial notches of the conical head and as it continues in its rotation they are forced inwardly at which position the ports are in alignment with the radial notch which communicates with the passage leading to the fuel passage 93 through the conduit 79, into the heating vessel and out through the jets of the nozzle.

The end of the shaft 116 carries a yoke 117 in which is mounted a shaft 118 carrying a beveled gear 119, which engages a beveled gear 120, carried by the shaft 116, which beveled gear is held in mesh with the gear 119, by a coil spring 121, whereby the rotation of the shaft 118 through the medium of the shaft 116 and its eccentric connection with the arm of the cylinder will raise and lower the cylinder so as to adjust the stroke of the pistons of the rotor. This construction enables the pump to be adjusted so that a predetermined quantity of fuel will be forced through the charge forming device and in order to provide means whereby the known quantity of fuel being consumed can be ascertained, the shaft 118 is connected to the shaft 112 of a pointer 123 through a medium of a flexible shaft 124 or the like, said pointer working over graduated dial 125. By adjusting the pointer and setting the same to the numeral 15 as shown, the pump will be rotated so as to deliver one gallon of fuel to every fifteen miles the motor travels and I have experimented with my improved construction of charge forming device and find that under ordinary conditions the pointer can be set to the numeral 35, which indicates that a motor will travel 35 miles on each gallon of fuel pumped through the device. By operating the shaft of the pointer, the stroke of the pistons of the pump are increased and decreased so as to increase or decrease the forcing capacity of the pump.

The pump housing 84 is connected to a suitable source of fuel supply by a pipe 126, which may be either a gravity fed or the tank may be arranged below the level of the charge forming device as in connection with the construction of charge forming device herein shown. I have provided means for automatically maintaining fuel at a predetermined level within the pump housing so that the pump will be supplied with fuel at all times.

To accomplish this result, I provide the top of a pump housing with a threaded bore 127, in which is threaded the stem of a reservoir 128, which herein shown is in the form of an oil gauge having a cylinder glass wall and provided with top and bottom metal members. The upper member 129 is provided with an outlet 130, having a valve seat 131, adapted to receive a conical valve 132, carried by a stem 133, which is connected to a float 134, which float is guided by the valve stem which extends into the inlet and outlet of the chamber. The outlet is connected to the intake manifold or induction pipe by a conduit 135, whereby the suction of the engine will be extended down through the fuel chamber into the pump housing which will draw fuel out of the fuel reservoir so as to fill the pump housing as the pump housing is filled the fuel therein rises into the reservoir and the float lifts the valve and cuts off communication between the induction pipe of the engine and the reservoir. As soon as the fuel is consumed out of the pump housing, the float drops and opens up communication so as to draw additional fuel into the pump housing and by this means a system is provided for maintaining fuel within the pump housing whereby the vacuum system now in use can be dispensed with.

Figures 7, 8, 9, 10, 11:
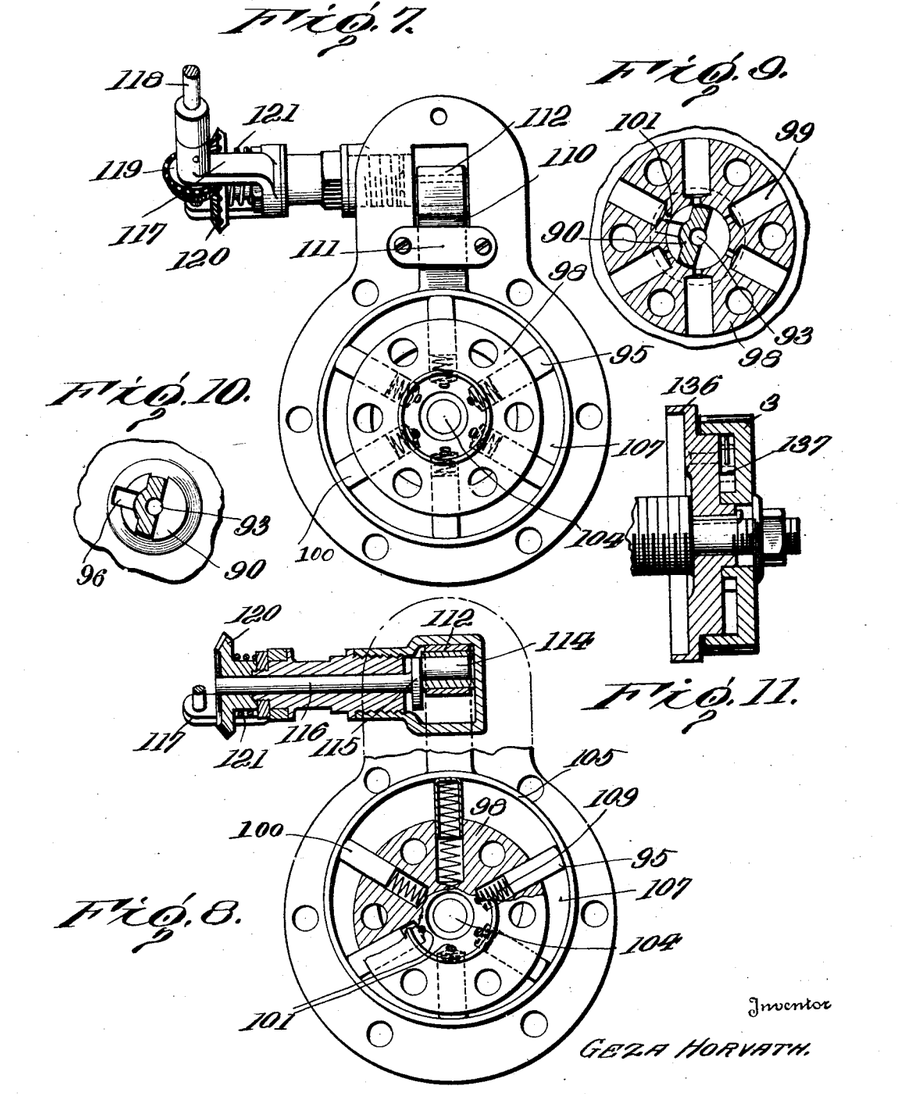
Figure 7 is a detail elevation of the end plate of the pump housing showing the rotor pump and the means for adjusting the same in order to supply a predetermined amount of fuel to the charge forming device.
Figure 8 is a similar view of Figure 7, partly in section, showing the construction of the pistons and the means for adjusting the cylinder surrounding the same.
Figure 9 is a section through the rotor of the pump.
Figure 10 is a detail view, partly in section, showing the projection of the pump housing through which the fuel is forced.
Figure 11 is a section through the driving gear and hand-wheel showing a pawl and ratchet connection to enable the hand-wheel to be operated independent of the driving gear for priming the device.
Figure 12:
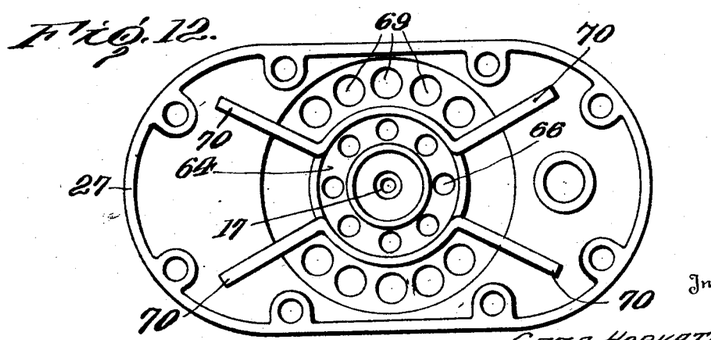
Figure 12 is an inverted plan view of the casting forming an auxiliary heating chamber for the air delivered between the jets.

The shaft 104 carries a hand wheel 136, by means of which the shaft can be rotated and is connected to the gear wheel 103, by pawl and ratchet mechanism 137, as shown in Fig. 11, whereby the hand-wheel can be turned independent of the gear wheel which enables the pump to be operated by hand so as to form a primer before the engine is started. By this construction when the gear 3 is rotated by the shaft 104 and as this shaft 104 carries the rotor of the pump the same will be rotated so as to force the fuel through the charge forming device.

In the specification and drawings, I have illustrated and described certain details of construction of the various parts, but I do not wish to limit myself to these details of construction as I am aware that various changes can be made without departing from the spirit of my invention.

In the operation of a charge forming device as herein shown and described, assuming that the engine is running, the exhaust gases will pass through the heating chamber and circulate around the heating vessel 15, into which has been forced fuel under pressure by the pump and this heat acts on the fuel within the vessel in such a manner as to superheat the same. This heated fuel then passes upwardly through the fuel passage and is injected through the plurality of jets of the disk nozzle. At the same time air is drawn into the casing and heated by being caused to circulate around the fins and circulates up and is delivered to the mixing chamber through a series of air passages around the series of jets. As the throttle valve is open an additional air is admitted from the air chamber and as the rotary air valve is connected to the throttle so as to operate in unison and this additional air with the preheated air and vapor or heated fuel mixes within the mixing chamber and produces a very efficient explosive mixture out of any grade fuel.

The capacity of the pump is first such that the fuel is fed under pressure and maintained under pressure within the heating vessel, whereby the same is superheated and maintained in liquid form before it is delivered to the mixing chamber.

From the foregoing description, it will be seen that I have provided a charge forming device having a mixing chamber provided with means for delivering heated air and superheated liquid fuel thereto in addition to means for supplying auxiliary air in connection with means for forcing the fuel into a heating vessel and maintaining the fuel in said vessel under pressure so that the fuel will be superheated before it is delivered to the action of air whereby it will mingle more readily with the currents of air and form an absolutely dry and very efficient explosive mixture.

This arrangement supplies the additional advantage of eliminating entirely the condensation of vapors and the slow burning process which exists in the present form of standard carburetors. In connection with these advantages it will also be recognized that the spark ignition can be retarded to a very marked degree over the old method. This in turn will give an increased power capacity to the engine, as the explosions are more momentous.

I do not wish to limit myself to the particular construction of the fuel feeding pump or the construction or location or nature of the heating element, or the construction of the mixing chamber as these will be constructed several ways according to construction of engine to which it will be adapted, as stationary, marine, or motor vehicles may require different construction.

What I claim is:—

1. A charge forming device for internal combustion engines comprising a housing provided with open sides, said housing being provided with an outlet, plates secured to the open sides of said housing having exhaust pipes connected thereto through which the exhaust gases of the engine are adapted to pass, a fuel container arranged within said housing, a plate arranged over the top of said housing provided with a stem having fuel passages communicating with the fuel container, a casting arranged over said plate having an air chamber and provided with a tubular portion forming a mixing chamber, a valve seated upon the upper end of said stem, means for adjusting said valve and a disk nozzle arranged over said stem having a plurality of jets.

2. A charge forming device for internal combustion engines having a mixing chamber provided with a throttle controlled outlet, said mixing chamber being provided with a plurality of air inlets, a rotary valve for controlling said air inlets, a connection between said rotary valve and throttle, and means for delivering to said mixing chamber a plurality of jets of superheated fuel, and a plurality of jets of air forming an explosive charge.

3. A charge forming device for internal combustion engines comprising a mixing chamber having means for delivering superheated fuel and air to the lower portion thereof, a heating chamber, a vessel arranged within said heating chamber for superheating the liquid fuel and converting the fuel into a dry gas, a pump for forcing said fuel into said vessel and maintaining said fuel under pressure and means for adjusting the capacity of said pump.

4. A charge forming device for internal combustion engines comprising a mixing chamber having a plurality of air holes in its wall, a rotary valve for controlling the passage of air through said air inlets, a disk nozzle disposed in the bottom of said mixing chamber having a plurality of jets, said disk nozzle being provided with a plurality of air inlets, a heat chamber, a coil or vessel arranged within said heat chamber, means for forcing and maintaining fuel in said coil or vessel under pressure for superheating the liquid fuel for converting the fuel to dry gas, valve controlled means for regulating the passage of superheated fuel from said coil or vessel to said nozzle, and means for supplying air inlets with heated air.

5. A charge forming device for internal combustion engines having a mixing chamber surrounded by an auxiliary air chamber, said mixing chamber being provided with a plurality of air inlets, a valve surrounding said mixing chamber provided with air inlets adapted to register with the air inlets of said mixing chamber, a throttle valve controlling the outlets of said mixing chamber, a connection between said throttle valve and air valve and means for supplying said mixing chamber with superheated fuel and hot air.

6. A charge forming device for internal combustion engines comprising a housing forming a heat chamber, a plate for closing the upper end of said housing, a stem carried by said housing provided with fuel passages terminating in a chamber at its upper end, a valve for closing said chamber, a disk nozzle arranged over said stem having a plurality of fuel jets, a vessel arranged within said heat chamber in communication with the fuel passage of said stem, and a pump for forcing and maintaining fuel in said vessel under pressure.

7. A charge forming device for internal combustion engines having a mixing chamber, a heat chamber and a pump for forcing fuel through said heat chamber into said mixing chamber, a valve for controlling the outlet of said mixing chamber, said mixing chamber being provided with a plurality of air inlets in its wall, a rotary valve surrounding said mixing chamber and means connecting said rotary valve to the outlet valve of said mixing chamber for increasing the supply of air to said mixing chamber as the outlet valve is opened.

8. A charge forming device for internal combustion engines having a mixing chamber provided with means for supplying air and fuel thereto, a rotary fuel pump having a plurality of pistons and means located on the dash of the vehicle to which the charge forming device is attached for adjusting the stroke of said pistons, for determining the quantity of fuel delivered to said charge forming device.

9. A charge forming device for internal combustion engines having a mixing chamber provided with means for supplying heated fuel and heated air thereto, said mixing chamber being provided with auxiliary air inlets, and a throttle valve controlling the outlet of said mixing chamber, an air valve for controlling said auxiliary air, a connection between said air valve and throttle valve, a pump housing, a pump in said housing, for forcing fuel into said mixing chamber, a connection between said housing and induction pipe of the engine, and a float controlled valve for controlling said connection.

10. A charge forming device for internal combustion engines having a pump for supplying fuel thereto, said pump comprising a conical stem having a rotor provided with a conical socket revolubly mounted upon said stem, said stem being provided with a fuel passage, said rotor having a plurality of bores forming pump cylinders, spring pistons mounted within said bores, a slidably mounted cylinder surrounding said rotor and means for adjusting said cylinder for increasing and decreasing the stroke of said pistons.

11. A charge forming device for internal combustion engines having a motor driven pump for supplying fuel thereto, hand operated means for rotating said pump, independent of the motor driving means, and means controlled by the vacuum of the induction pipe for supplying fuel to said pump.

12. A charge forming device for internal combustion engines comprising a housing forming a heat chamber provided with an outlet, said housing being connected to the exhaust pipes of an internal combustion engine, a plate mounted on said housing provided with a stem having fuel passages terminating in a chamber at their upper ends, a coil or vessel disposed in said housing, connected to said stem, a coil or vessel disposed in said housing, connected to said stem, means for forcing fuel into said coil or vessel, a spring valve closing the chamber of said stem, means for adjusting the tension of said spring, a casting arranged on said plate having a tubular portion surrounding said stem forming a mixing chamber at its upper end and an air chamber at its lower end, a disk nozzle carried by said stem, having a plurality of fuel jets and a plurality of openings, an air chamber surrounding said mixing chamber, said air chamber being in communication with said casting and through which air is adapted to pass into said mixing chamber between the fuel jets.

13. A charge forming device for internal combustion engines comprising a housing having a plate mounted thereon provided with a stem having fuel passages terminating at their upper ends in a chamber, a valve for closing said chamber, a casting arranged on said plate having a tubular portion forming a mixing chamber at its upper end and an air chamber at its lower end, a member surrounding said mixing chamber forming an auxiliary air chamber, said auxiliary air chamber being in communication with the first mentioned air chamber, a cap member secured over said mixing chamber having a throttle valve, a disk nozzle threaded on said stem having an enlarged portion to receive said valve, means carried by said disk nozzle for adjusting said valve, said disk nozzle being provided with a plurality of fuel jets and a plurality of air passages, a coil or vessel arranged within said heat chamber in communication with the fuel passages of said stem, and a rotary pump for forcing fuel into said coil or vessel.

14. A charge forming device for internal combustion engines, comprising a main heat chamber, an auxiliary heat chamber, and a mixing chamber, said mixing chamber having in its bottom a plurality of fuel jets, and a plurality of air inlets, the wall of said mixing chamber being provided with a plurality of auxiliary inlets, an air chamber surrounding said mixing chamber, a valve controlling said auxiliary air inlets, a coil or vessel disposed in the main heat chamber, means for conveying fuel from said coil or vessel to said fuel jets and means for forcing fuel into said coil or vessel.

15. A charge forming device for internal combustion engines having means for superheating the fuel, means for forcing said fuel through said superheating means and maintaining it under pressure by said forcing means, means for injecting said superheated fuel into a mixing chamber and means for supplying said mixing chamber with hot and cold air.

16. A charge forming device for internal combustion engines having means for superheating the fuel and maintaining it under pressure, means for adjusting the pressure maintained in said superheating device and means for injecting said superheated fuel through a plurality of jets into a mixing chamber.

17. A charge forming device for internal combustion engines having means for superheating the fuel and maintaining it under pressure, means for releasing the pressure of said fuel for starting the internal combustion engine to which the charge forming device is attached, and said means being controlled from the dash of the motor vehicle.

18. A charge forming device for internal combustion engines comprising a mixing chamber having means for supplying air thereto, a superheater, means for forcing fuel through said superheater and maintaining said fuel in said heater under pressure for converting said fuel into a dry gas, means for regulating the pressure maintained in said heater and means for injecting said dry gas through a plurality of jets to said mixing chamber.

In testimony whereof I hereunto affix my signature.

GEZA HORVATH.